July 20, 1954    J. B. ABELE ET AL    2,684,255
JOINT SEAL STRUCTURE
Filed Dec. 15, 1949    2 Sheets-Sheet 1
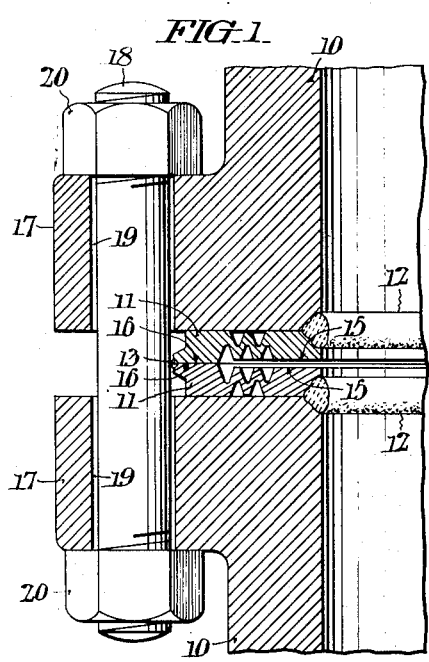
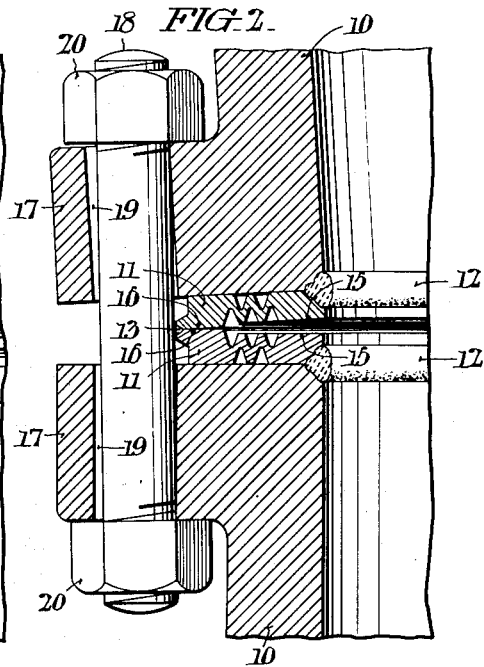
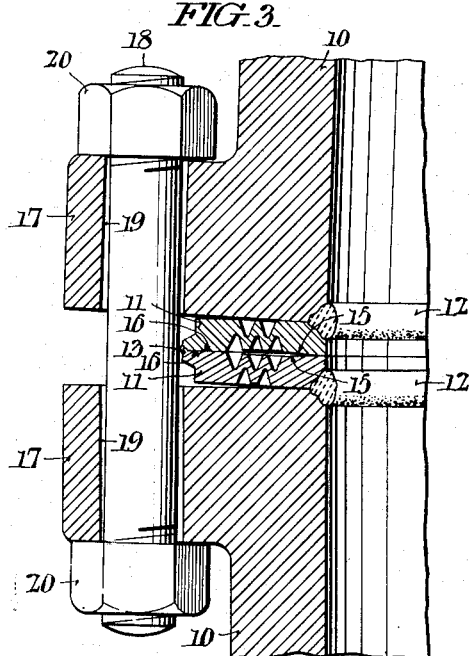
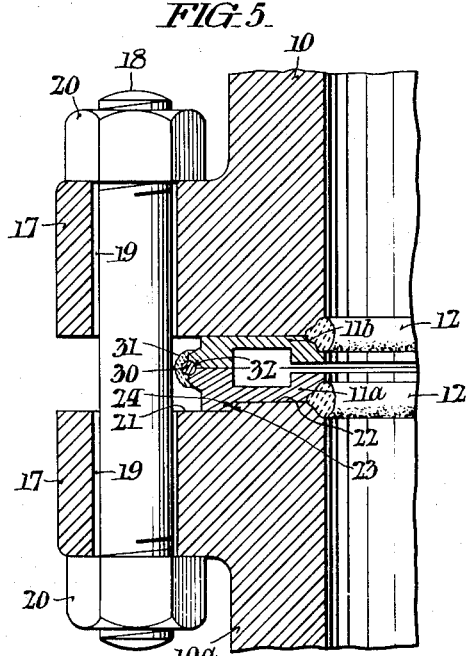
WITNESSES
INVENTORS:
Joseph B. Abele &
William F. Oberhuber
BY
ATTORNEYS.

Patented July 20, 1954

2,684,255

UNITED STATES PATENT OFFICE 2,684,255

JOINT SEAL STRUCTURE

Joseph B. Abele and William F. Oberhuber,
Philadelphia, Pa.

Application December 15, 1949, Serial No. 133,044

8 Claims. (Cl. 285—90)

1

This invention relates to a connecting seal for adjoining fluid chambers and more particularly relates to a sealed joint structure for connecting separate pipe sections or other fluid chambers.

In the transmission and processing of fluids such as water, steam, and gases in containers, particularly in handling fluids under high pressure, considerable difficulty has been encountered in preventing fluid leakage at joints between pipe sections or other adjoining fluid chambers. For example, in power plants operating at high steam pressures, steam frequently leaks through the gaskets of the usual flanged pipe joints despite the exertion of high compressive stresses on the gaskets. Similar difficulties are experienced in preventing leaks through other joints such as those incorporated in turbine casings, valve bonnets, and the like. Particular difficulty is encountered in preventing steam leakage in joints which are positioned near the bottom of a steam chamber since condensate occasionally collects near the joint thereby cooling and locally contracting parts of the joint with resultant deformation of the gasket compressing surfaces. Similar difficulties are encountered in equipment for handling liquids and gases, particularly in cases where mechanical vibrations or fluctuations in temperatures are encountered.

As a solution to these problems it has been proposed to weld the flanges of pipes together. However, this is objectionable in that it becomes difficult to take the pipes apart and to reassemble them in a different location. Moreover, the contraction of metal due to local cooling and heating tends to strain the welds excessively, thereby causing leaks.

It is accordingly an object of our invention to provide a fluidtight connecting seal for adjoining fluid chambers. Another object is to provide a fluidtight joint for fluid chambers which remains sealed despite the effect of local temperature fluctuations. A still further object of the invention is to provide a flexible seal between adjoining fluid chambers. Still another object of the invention is to provide a readily demountable fluid tight welded joint for adjoining fluid chambers.

The foregoing and other objects of the invention, including the simplicity and economy of same, will appear from the following description of the invention, having reference to the accompanying drawings.

In summary, the invention comprises a connecting seal for adjoining fluid chambers comprising a flexible seal piece sealed to a section of

2 one chamber and another flexible seal piece sealed to a section of the other chamber, in which the seal pieces are also sealed together to form an independently movable fluidtight juncture.

Of the drawings:

Fig. 1 is a fragmentary vertical sectional view of a flexible seal structure of the invention as incorporated in a joint for normally aligned pipes.

Fig. 2 is a view similar to Fig. 1 in which the pipes are misaligned in one direction, such misalignment being exaggerated for purposes of illustration.

Fig. 3 is also a view similar to Fig. 1 in which the pipes are misaligned in another direction, such misalignment also being exaggerated for purposes of illustration.

Fig. 5 is a fragmentary vertical sectional view of another embodiment of the invention as incorporated in a pipe joint.

Figure 4:
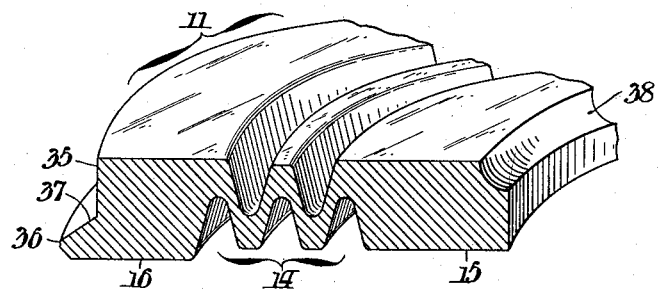
Fig. 4 is a fragmentary perspective view of a portion of the seal ring of Figs. 1–3.

The embodiment of the invention which appears in Fig. 1 comprises a pair of pipes 10 and a pair of flexible seal rings 11 disposed between the adjacent end surfaces of pipes 10 which may be of metal. Seal rings 11 which may also be of metal or any other suitable material extend circumferentially around the adjacent end openings of pipes 10, and are sealed therein by welding or other appropriate sealing means. As indicated in the drawings, each seal ring 11 is welded to the adjacent inner surface of pipe 10 by means of inner weld 12 which extends circumferentially around the inner surface of adjacent pipe 10. The seal rings are suitably cut away to provide arcuate recesses 38, 39, 40, see Figs. 4, 6, and 7. Each flexible seal ring 11 has a grooved or corrugated flexible element 14 (see also Fig. 4) positioned centrally in and extending annularly around the seal rings 11. Inner opposed side faces 15 of seal rings 11 are recessed annularly to provide clearance for movement of welds 12 toward each other while outer opposed side faces 16 of seal rings 11 are in contact with each other. It will be noted that the outer edges of seal rings 11 have reduced cross sections and have a pair of parallel spaced faces 35 and 36 which are perpendicular to outer side face 16 and a sloping end face 37 intermediate end faces 35 and 36. At their outer edges, seal rings 11 are sealed together by outer weld 13 which extends around the entire outer peripheries of the seal ring 11. Outer weld 13 is a relatively shallow weld and is accordingly referred to as a seal weld as contrasted to a strength weld.

Formed integrally with each pipe 10 is a conventional peripheral flange 17. Bolts 18 extend through bolt holes 19 in flanges 17. Nuts 20 are threaded to bolts 18 and are instrumental in imparting mechanical strength to the sealed joint.

A modified structure of the invention appears in Fig. 5. The general arrangement of pipes and connections is similar to the arrangement described in connection with Fig. 1. However, it will be noted that the end surface 21 of pipe 10a is annularly recessed from end surface 22, thereby forming a circumferential shoulder 23 on pipe 10a. Seal strip 11a is correspondingly recessed annularly to form a circumferential flange 24 whereby the shoulder 23 and the flange 24 may be brought into operative engagement as shown.

Figure 6:
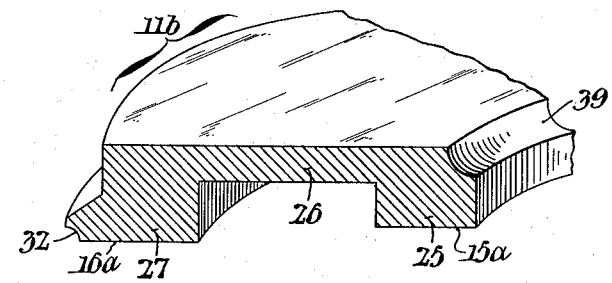
Fig. 6 is a fragmentary perspective view of one seal ring of the embodiment of the invention which appears in Fig. 5, and, Fig. 7 is a fragmentary perspective view of the other seal ring of the embodiment of the invention which appears in Fig. 5.
Figure 7:
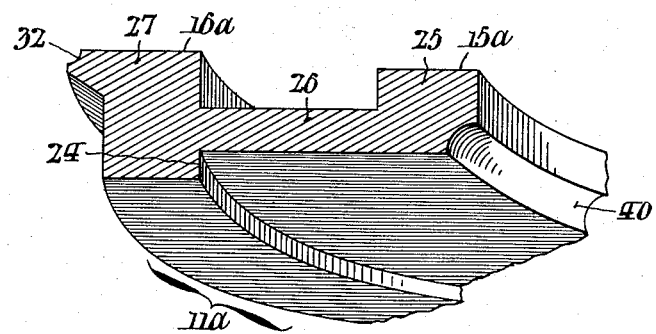

The seal rings 11a and 11b which appear in Figs. 5, 6 and 7 have channel shaped cross sections, each channel being composed of inner flange 25, web 26, and outer flange 27. The adjacent opposed surfaces 16a of outer flanges 27 are in contact with one another while the opposed surfaces 15a of inner flanges 25 are spaced apart from one another. For example, the invention is applicable to joints for sealing container edges such as turbine casings or the like which are not ring shaped in cross section. Accordingly it will be appreciated that, by "washer-like elements" in the claims we mean strips which may either be rings or portions of rings, or washer-like strips of other shapes constructed to correspond to the shapes of the adjacent edges which are to be sealed. Webs 26 are spaced apart from one another and have a relatively small cross-sectional dimension thereby imparting flexibility to the seal rings 11a and 11b.

While inner welds 12 are relatively permanent strength welds, outer weld 31 which appears in Fig. 5 is a demountable seal weld. The outer adjacent surfaces of seal rings 11a and 11b are shaped to form recesses 32 of arcuate cross-section for the reception of circular wire 30 which extends around the entire outer peripheries of seal rings 11a and 11b. Seal rings 11a and 11b are sealed together by weld 31 which extends around the entire outer circumference of seal rings 11a and 11b and covers wire 30. Weld 31 also includes an outer portion of wire 30 which is desirably made of the same metal as seal rings 11a and 11b and interfuses partially therewith during the welding operation. It is to be understood that wire 30 may be of any desirable cross-sectional shape with appropriate modification of the shape of recesses 32.

As a modification of the structure which appears in Fig. 5, wire 30 may be composed of a metal having a relatively high melting point and seal rings 11a and 11b may have relatively low melting points. The seal rings are welded together at a temperature above the melting point of the seal rings 11a and 11b but below the melting point of the wire 30 to imbed the wire 30 in the outer weld 31, thereby forming an outer seal structure in which wire 30 is not welded to either seal ring.

In accordance with our invention, the joint seal remains fluidtight even when the abutting edges of the fluid chambers are disposed at angles to each other. As shown in Fig. 2, when welds 12 are moved away from each other the flexible seal strips bend slightly thereby minimizing the stress on weld 13. Similarly as appears in Fig. 3, when welds 12 are brought closer together, the flexible seal strips bend toward each other to prevent the exertion of any substantial tensile stress on weld 13. The welded seal structure of our invention may be deformed radially as by moving weld 13 toward and away from bolt 18 and may also be deformed longitudinally as by moving weld 13 parallel to bolt 18 or by moving welds 12 toward and away from each other. In either case the change of position of the welds with respect to each other does not appreciably increase the mechanical stress on any weld.

The embodiment shown in Fig. 5 represents a welded joint having excellent leak resistance. The joint is also constructed for rapid detachment and reassembly of pipe sections. In taking apart the welded pipe joint, bolts 18 are removed, the outer layer of weld metal 31 is chipped away, wire 30 is stripped away from the accommodating seal ring recess 32, and the pipes may be separated in the usual manner. A new joint is subsequently made, using the same seal strips 11a and 11b, by inserting a new wire 30 of suitable size into the recess 32 between the adjacent seal strips 11a and 11b, welding the seal strips 11a and 11b together over the wire 30, and inserting bolts 18. The provision of wire 30 facilitates rewelding in that the inner surfaces of recess 32 in the seal strips 11a and 11b are neither welded nor chipped away during the detachment and reassembly operations and therefore provide a uniform base of uniform depth for the formation of the new weld. Weld 13 is a demountable weld having only the strength required for opposition of the pressure of the contained fluid. Weld 13 need not be stronger than this since the pipes 10 are preferably held together by mechanical means such as bolts 18 and nuts 20.

Our new joint seal is particularly advantageous in its resistance to leakage when subjected to severe fluctuations in temperatures and to changes in alignment of the adjacent container sections. In the sealed joint of our invention the flexibility of the seal pieces relieves internal stresses and protects the welds from damage. In our new joint it is not necessary to pull the separate adjoining chambers tightly together for purposes of preventing leakage. Relatively small bolts may accordingly be provided for holding the sections together. This is significant in the economy attained thereby and particularly in the convenience in service thereby provided, since studs and bolts of unusually large diameters have been required in power plant installations, and these have been expensive, cumbersome and difficult to handle.

While the various seals of the invention have been shown in the form of welds, it will be appreciated that in the practice of the invention other types of seals will be found to be desirable in certain cases, depending upon the requirements of the structure as to strength, pressure and temperature. For example, for handling gases, vapors and liquids at relatively low pressures and temperatures, it will be desirable in some instances to form some or all of the seals by means of brazing, soldering or by other means known in the art for sealing like or unlike metals or other materials together. Mechanical means such as studs or screws may be provided in combination with the seals to impart additional strength in connecting a seal strip to a fluid chamber. However for high pressure work we prefer sealing means in which the members are fused together as by welding. The inner welds 12 are preferably strength welds which serve as seals and as mechanical joints while outer weld 13 is preferably a relatively light weld or seal weld which is easily chipped away.

It will be appreciated that the invention is not limited to the provision of a sealed joint for pipes or for articles having rounded or circular junctures but is adapted for the formation of a seal between any adjacent edges or surfaces of separate fluid chambers.

While we have described our invention with reference to two embodiments thereof, it will be apparent to those skilled in the art that various changes other than those referred to above may be made in the form of the device, that equivalent elements may be substituted for those specifically illustrated in the drawings, and that certain features of the invention may at times be used to advantage independently of the use of other features, all within the scope and spirit of the invention as defined in the appended claims.

Having thus described our invention, we claim:

1. A connecting joint for sealing adjacent faces of containers comprising a pair of substantially parallel adjacent washer-like elements intermediate said faces, inner marginal portions of said washer-like elements being welded to the respective containers forming inner seal welds, said elements also being welded together forming along their outer marginal edges an outer seal weld which is spaced outwardly from the inner seal welds, each said washer-like element having material removed from a portion thereof intermediate said inner and outer edges, thereby forming a plurality of grooves, the grooves in one face of each washer-like element being arranged substantially parallel to each other and in staggered relation with respect to a groove or substantially parallel grooves in the other respective faces of said elements, said grooves being close together to form flexible walls therebetween whereby the inner and outer seal welds are relatively movable.

2. The connecting joint defined in claim 1 wherein the grooved material of said intermediate portion is of less cross section than said outer and inner portions of said washer-like elements.

3. The connecting joint defined in claim 1 wherein said container faces bear directly on opposed portions of said washer-like elements, and wherein said opposed portions bear against one another.

4. The connecting joint defined in claim 1 wherein the outer marginal portion of each washer-like element is thicker than its inner marginal portion, said outer marginal portions bearing against one another while said inner marginal portions are spaced apart from one another and have capacity for relative rocking movement.

5. The connecting joint defined in claim 1, wherein the washer-like elements are confined to the space directly between the adjacent container faces.

6. The connecting joint defined in claim 5, wherein the containers are pipes having flanges, and wherein fastening means extend between the flanges bridging across said washer-like elements.

7. The connecting joint defined in claim 1, wherein the washer-like elements are recessed along their outer marginal edges, and wherein a separate and distinct elongated piece of metal is imbedded in said outer seal weld.

8. The connecting joint defined in claim 7 wherein said separate and distinct piece of metal has a melting point above the melting point of said outer edges of said washer-like elements.

References Cited in the file of this patent

UNITED STATES PATENTS

| Number | Name | Date |
| --- | --- | --- |
| 1,493,269 | Kruesi | May 6, 1924 |
| 1,786,506 | Ray | Dec. 30, 1930 |
| 1,926,107 | Morehead | Sept. 12, 1933 |
| 1,929,401 | Badger | Oct. 10, 1933 |
| 1,944,135 | Dennis | Jan. 16, 1934 |
| 2,366,579 | Von Ahrens | Jan. 2, 1945 |
| 2,384,672 | Gleeson | Sept. 11, 1945 |
| 2,470,167 | Hobbs et al. | May 17, 1949 |
| 2,481,472 | Culp | Sept. 6, 1949 |
| 2,487,410 | Baker | Nov. 8, 1949 |
| 2,493,404 | Haynes | Jan. 3, 1950 |
| 2,565,296 | Chyle | Aug. 21, 1951 |